Patented Feb. 18, 1930

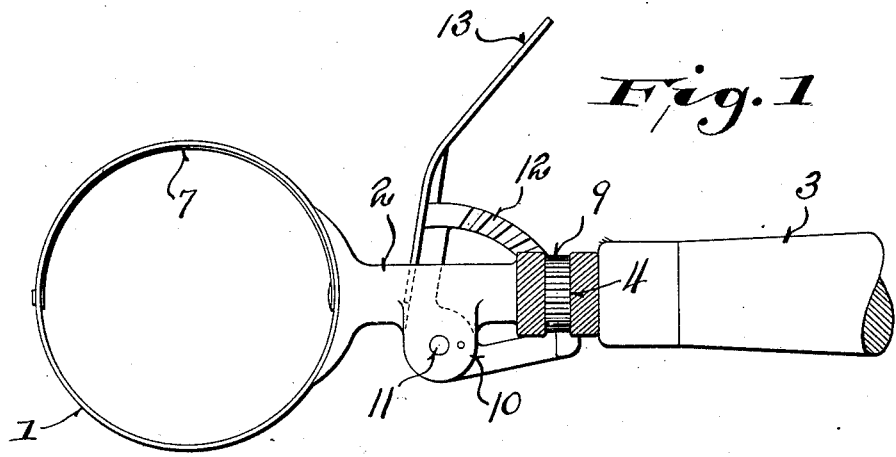
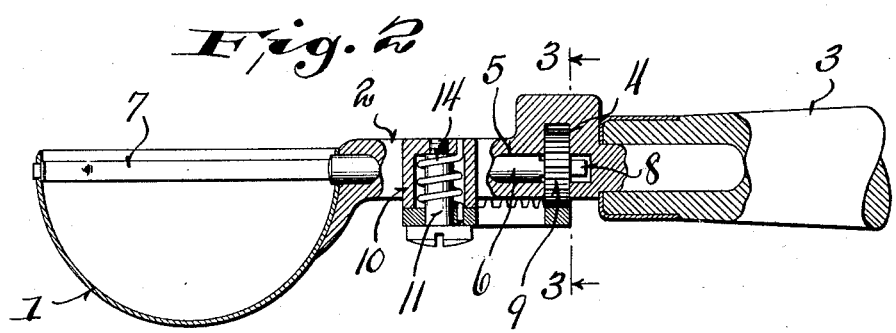
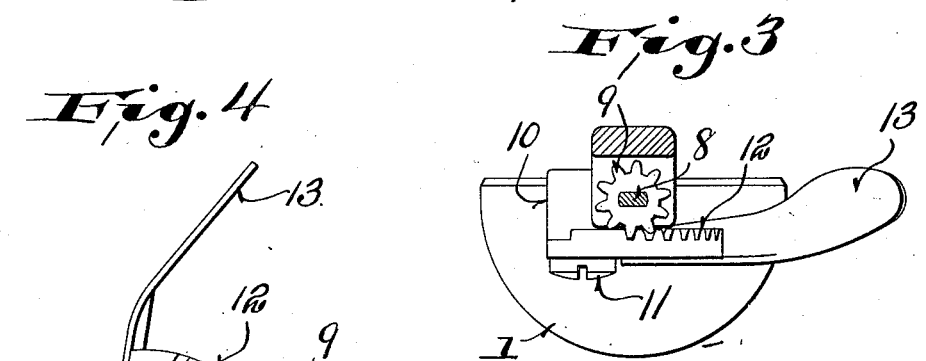
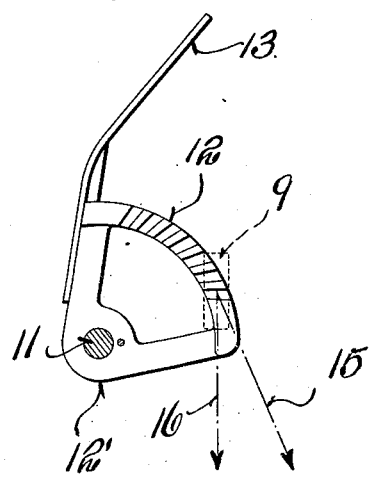

1,747,737

UNITED STATES PATENT OFFICE

GEORGE D. RUETZ, OF RACINE, WISCONSIN, ASSIGNOR OF ONE-THIRD TO JOHN J. HEINISCH, OF RACINE, WISCONSIN

ICE-CREAM DISHER

Application filed February 27, 1928. Serial No. 257,389.

This invention relates to dishers, and is particularly directed to an ice cream disher.

In ice cream dishers, as heretofore constructed, it has been found that when very hard or stiff ice cream is dished out, that the effort required by the thumb of the operator is comparatively large, with the consequent result that the operator experiences considerable annoyance in the continual use of the disher.

This invention is designed to provide an ice cream disher which is so constructed that although extremely simple gearing is employed nevertheless the leverage is materially increased over that heretofore secured by the ordinary construction of ice cream dishers.

Further objects are to provide an ice cream disher which may be very cheaply manufactured, which is of sturdy and simple construction, and which has a very small number of easily assembled parts.

An embodiment of the invention is shown in the accompanying drawings in which:

Figure 1 is a view of the disher with parts broken away and with a part in section;

Figure 2 is a longitudinal sectional view through the structure shown in Figure 1;

Figure 3 is a sectional view on the line 3—3 of Figure 2;

Figure 4 is a view of the main or segmental gear with the pinion or spur gear shown in dotted lines.

Referring to the drawings, it will be seen that the disher comprises a bowl 1 which is preferably hemispherical and which is attached to a handle consisting preferably of a metal portion 2 rigid with the bowl and a wooden extension 3, although obviously other materials could be used. The section 2 of the handle, as shown in Figure 2, is provided with a transverse slot 4 opening through its bottom and is provided with a longitudinal aperture 5 within which the shaft 6 of the scraper 7 is located. This shaft is provided with a flattened end 8 which fits within a correspondingly apertured spur gear 9.

Further, it is to be noted that the section 2 is provided with a downwardly opening offset hollow boss 10. Within this boss, the pintle screw or pivot screw 11 for the segmental gear 12 is positioned. The screw 11 passes through the hub 12' of the segmental gear and is shouldered and threaded into the upper portion of the boss 10. It is to be noted that this screw 11 is offset from the longitudinal axis of the spur gear 9. It is so arranged that the axis of the segmental gear 12 is at right angles and offset with reference to the axis of the spur gear 9.

The segmental gear is operated by means of a thumbpiece 13 which is rigidly attached thereto and it is retracted by means of a coiled spring 14 loosely surrounding the pivot screw 11 and having one end set in an aperture formed in the top of the boss 10, and the other end received within an aperture formed in the hub 12' of the segmental gear, as most clearly shown in Figure 2.

It is to be noted from the description and drawing that the disher provides a scraper rigid with the shaft 6 and also rigidly connected to the spur gear or small pinion 9.

It is to be noted particularly that the teeth of the pinion 9 are radial and extend straight across the face of the small gear or pinion. However, the teeth of the segmental gear are angularly arranged with reference to the corresponding radial lines of the segmental gear.

From reference to Figure 4, it is apparent that there is a cam action or a transverse sliding action of the teeth of the segmental gear 12 with reference to the teeth of the spur gear 9.

This action may be explained differently by stating that the distance travelled by a tooth of the segmental gear 12 may be indicated roughly by the arrow line 15 in Figure 4, while the distance travelled by a tooth on the spur gear may be indicated by the arrow line 16. It is apparent that a materially greater distance of travel is secured for the teeth of the segmental gear than for the teeth of the spur gear as indicated by the lines 15 and 16. Thus, an increase in leverage is secured. It is also clear that by varying the position of offset of the axis of the segmental gear with reference to the axis of the spur gear, that any desired relative leverage may be secured, of course, within practical limits.

From actual tests conducted with a device constructed in accordance with this invention, it has been found that the actual increase in leverage is material and that a materially lesser pressure need be exerted upon the thumbpiece of the disher than has heretofore been necessary in order to dislodge ice cream of any given consistency. Obviously, therefore, this disher is eminently suited for handling relatively hard ice cream, and it will dislodge the scooped up ice cream with a minimum of effort on the part of the operator.

It is to be noted particularly from reference to Figure 4, that the teeth are cut into the segmental gear 12 and that uncut portions of the segmental gear are left at the ends of the teeth. These uncut portions form stops in cooperation with the spur pinion to limit the motion of the segmental gear.

It is to be noted also that there are extremely few moving parts in this apparatus and that consequently frictional losses have been reduced to a minimum, in addition to materially simplifying the construction and lowering the cost of production.

Although the invention has been described in considerable detail, such description is intended as illustrative rather than limiting and as the invention may be variously embodied as the scope of such invention is to be determined as claimed.

I claim:

1. A disher comprising a bowl, a handle projecting therefrom, a scraper positioned inside said bowl, a spur gear operatively connected with said scraper, a segmental gear having teeth meshing with the teeth of the spur gear, and a thumbpiece rigid with said segmental gear, the teeth of the spur gear being radial and the teeth of the segmental gear being angularly arranged with reference to the radii of the segmental gear.

2. A disher comprising a bowl, a handle rigidly attached to said bowl, a scraper cooperating with said bowl, a spur gear operatively coupled to said scraper, a segmental gear carried by said handle with its axis at right angles to the axis of the spur gear and offset from the axis of the spur gear, and means for operating said segmental gear, the line of full engagement between the teeth of the spur and segmental gears being parallel to the axis of the spur gear.

3. A disher comprising a bowl, a handle secured thereto, a scraper cooperating with said bowl, a gear rigid with said scraper, a segmental gear meshing with said first mentioned gear and having its axis at right angles and offset with reference to the axis of said first mentioned gear, and means for operating said segmental gear.

4. A disher comprising a bowl, a handle rigid therewith, a scraper cooperating with said bowl, a shaft rigid with said scraper, a gear rigid with said shaft and having its axis in the general direction of the axis of the handle, a segmental gear meshing with said first mentioned gear and having its axis arranged at right angles and offset with reference to the axis of said first mentioned gear, and a thumbpiece rigidly carried by said segmental gear.

In testimony that I claim the foregoing I have hereunto set my hand at Racine, in the county of Racine and State of Wisconsin.

GEORGE D. RUETZ.